Jan. 12, 1937. C. W. GINTER 2,067,445
NOZZLE CONSTRUCTION
Filed Oct. 1, 1935
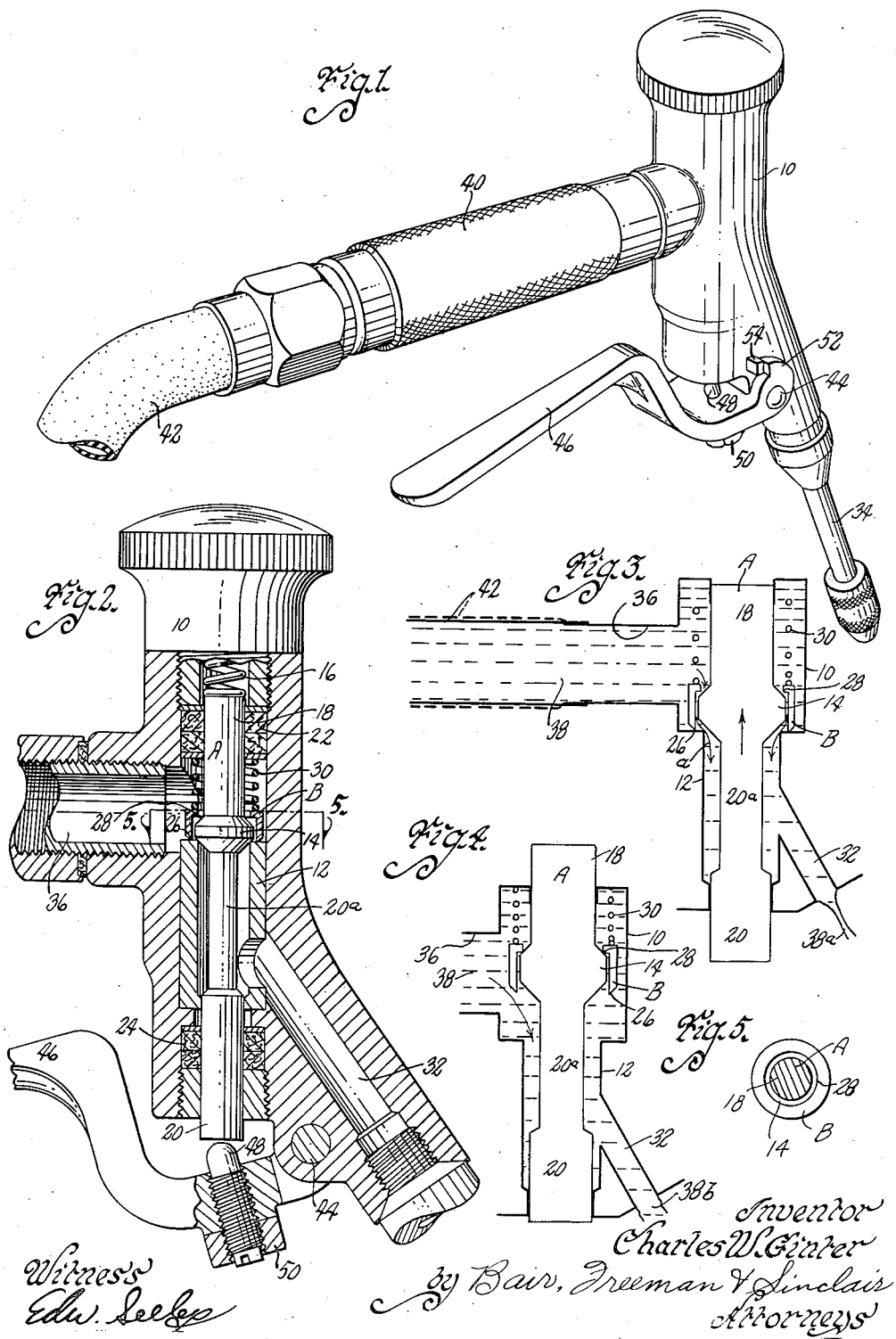
Inventor
Charles W. Ginter
by Bair, Freeman & Sinclair
Attorneys
Witness
Edw. Seeber Patented Jan. 12, 1937

2,067,445

UNITED STATES PATENT OFFICE 2,067,445

NOZZLE CONSTRUCTION

Charles W. Ginter, Bryan, Ohio, assignor to The Aro Equipment Corporation, Bryan, Ohio, a corporation of Ohio Application October 1, 1935, Serial No. 43,054

13 Claims. (Cl. 277—44)

The object of my invention is to provide a nozzle construction which is simple, durable and comparatively inexpensive to manufacture.

A further object is to provide a nozzle especially adapted for unrestricted volume delivery of lubricant or the like from a hose, the nozzle being so constructed that when initially opened restricted flow only is permitted to prevent a surge caused by the opening of the valve relieving the pressure, and the hose thereupon contracting and squirting a quantity of lubricant out of the nozzle.

Another object is to provide means inherent in a nozzle for preventing a surge when the nozzle is initially opened, the means being so arranged as to initially provide only restricted flow, but the valve being constructed, so that it can be opened to a position to permit unrestricted volume delivery after such surge prevention.

More particularly, it is my object to provide a nozzle construction in which primary and secondary valve members are seated against a valve seat and initial opening movement opens the primary valve member, which permits only restricted flow, further movement of the primary member opening the secondary member to permit the desired unrestricted volume delivery.

Another object is to spring load the secondary valve member or otherwise render it resistant to opening movement and to balance the primary valve member, so that the operator can tell by the feel of the nozzle handle when opening the valve just when he has only the primary valve open or when he picks up the secondary valve and opens it also.

With these and other objects in view, my invention consists in the construction, arrangement and combination of the various parts of my nozzle construction, whereby the objects contemplated are attained, as hereinafter more fully set forth, pointed out in my claims, and illustrated in the accompanying drawing, in which:

Figure 1 is a perspective view of a nozzle construction embodying my invention.

Figure 2 is a vertical, sectional view through the nozzle, showing details of construction, this figure being on an enlarged scale.

Figure 3 is a diagrammatic view showing the primary valve member only open for permitting only restricted flow and preventing the surge experienced by ordinary valves when attached to a hose having lubricant or the like under pressure therein.

Figure 4 shows the valve further opened to permit unrestricted volume delivery; and Figure 5 is a sectional view on the line 5—5 of Figure 2.

On the accompanying drawing, I have used the reference numeral 10 to indicate a valve body. Within the valve body 10, a sleeve 12 is pressed or otherwise mounted in a pressure-tight manner. The upper end of the sleeve 12 constitutes a valve seat.

A primary valve member A is mounted through the sleeve 12 and is provided with a head 14 normally seated against the valve seat by a spring 16. The primary valve member A has a pair of stems indicated respectively as 18 and 20, extending from opposite sides of the head 14. The stem 20 has a reduced portion 20a to permit unrestricted flow of lubricant through the nozzle as will hereinafter appear.

The stems 18 and 20 extend through packings 22 and 24 respectively. These stems are substantially the same size so as to balance the primary valve member A, since both stems are therefore of equal displacement and both extend exteriorly of the valve body.

A secondary valve member B is provided in the form of an inverted cup-like member having a central perforation. The rim thereof, indicated at 26, is seated against that portion of the valve seat on the upper end of the sleeve 12 surrounding the head 14. One edge of the perforation in the upper end of the member B is adapted for the head 14 to seat thereagainst as shown in Figure 4. This edge is indicated at 28.

The member B is constrained to remain seated by a spring 30, which also tends to maintain the packing 22 tight.

The valve body 10 is provided with a discharge passageway 32, extending to a nozzle 34, which, of course, may be of any suitable construction consistent with the purpose for which the nozzle construction is intended. The valve body is provided with a passageway 36 for lubricant 38, illustrated in Figures 3 and 4. The passageway 36 extends through a handle 40, which is connected to a hose 42.

The valve body 10 is provided with a pivot pin 44 to which a forked valve lever 46 is pivoted. The lever 46 is provided with an adjustable set screw 48 and a lock nut 50, the upper end of the set screw being adapted for engagement with the stem 20 for opening the valve when the lever is swung toward the handle 40 by the fingers of the operator.

The lever 46 is provided with stop lugs 52 and the body 10 is provided with cooperating stop lugs 54 to limit the opening movement of the lever 46.

Practical operation

Heretofore nozzle constructions have been provided consisting merely of a valve member to be unseated from a valve seat. The general trend in modern design of lubricating equipment is toward higher pressures; hence the necessity of a properly balanced control nozzle.

As far as practical, the hose 42 is made non-expandible, but even so, it has been found impractical to make it entirely so. Accordingly when the ordinary type of nozzle valve is closed, and the pressure builds up in the hose, due to the lubricant pump or other pressure producing device connected with the hose, the hose expands for instance to the dotted position shown in Figure 3, which, of course, is somewhat exaggerated, but serves to show what actually happens.

With my construction, when the valve is initially opened, the valve member A moves for instance to the position between the seat on the upper end of the sleeve 12 and the seating edge 28 of the member B.

The interior wall of the member B is a rather close fit with respect to the periphery of the head 14, for instance a very few thousandths of an inch. This space has been exaggerated on the drawing in order to illustrate the action.

When in the position of Figure 3 therefore, restricted flow only of the lubricant 38 is permitted as indicated by the arrow $a$. This restricted flow is evidenced by the small stream of lubricant 38$a$ issuing from the passageway 32. The distance between the seat on the sleeve 12 and the seat 28, of course, must be greater than the thickness of the head 14, where it is in alignment with these seats, in order to provide for this initial movement. This distance may vary to a great extent, approximately the minimum being shown on the drawing, so as to minimize the swinging of the lever 46 for this initial movement.

Upon further opening movement, the head 14 will seat against the seat 28 and then carry the member B to the position shown in Figure 4, whereupon the passage surrounding the stem 20$a$ is unrestricted and volume delivery as indicated at 38$b$ may be made.

Seating of the head 14 against the seat 28 will stop the restricted flow of lubricant. The operator can determine when such seating occurs, as the lubricant will cease flowing and thereafter the spring 30 together with the line pressure of the lubricant resists opening movement of the valve, and he can thus determine that volume delivery can be secured by further movement of the handle 46 which will open the valve member B.

Summarized there are three control steps which I will now point out:

No. 1.—Controlled or restricted high pressure delivery

This occurs when the head 14 of the member A is between the seat on the upper end of the sleeve 12 and the seat 28 of the member B. When the head is held in this position by the operator, he is enabled to get a slow delivery of a small stream of grease.

No. 2.—A measured shot or controlled delivery

This step is obtained by moving the head 14 from the seat on the sleeve 12 to the seat 28. Delivery takes place only while the head 14 is passing from one seat to the other, such delivery being immediately cut off when the head 14 comes in contact with the seat 28. Depending on how quickly the operator swings the handle 46 from one of these positions to the other, a measured shot of lubricant will be expelled, and after a few operations, the operator is able to predetermine the quantity of lubricant expelled during such a shot.

No. 3.—Volume delivery

This is obtained by pulling the lever 46 all the way toward the handle 40 as shown in Figure 4.

When the head 14 is seated against the seat 28, pressure will again be built up in the hose, which will cause a surge when the valve is opened further, but at that time, the elimination of such a surge is no longer such an important factor, because volume delivery is usually used when merely dispensing into a larger opening or receiver, such as a transmission or differential of an automobile.

My construction obviously prevents volume delivery upon initial opening of the valve and provides only restricted delivery, so that the hose 42 can slowly contract to prevent the undesirable surge experienced with most nozzles. After the surge period is ended, which takes but a second or two, the unrestricted volume delivery can then be secured as desired.

Some changes may be made in the arrangement and construction of the various parts of my nozzle construction without departing from the real spirit and purpose of my invention, and it is my intention to cover by my claims, any modified forms of structure or use of mechanical equivalents, which may be reasonably included within their scope.

I claim as my invention:

1. In a nozzle, a primary valve member adapted when initially opened to permit only restricted delivery of fluid through said nozzle, a secondary valve member adapted when open to permit unrestricted volume delivery of fluid through said nozzle, said secondary valve member having a seat engaged by said primary valve member as it is opened beyond said initial opening thereof to stop the flow of fluid through said nozzle, said primary valve member, upon further opening movement, opening said secondary valve member through engagement with said seat thereof.

2. In an unrestricted volume delivery nozzle, a primary valve member adapted when initially opened to permit only restricted delivery of fluid through said nozzle, a secondary, spring closed valve member adapted to be opened against the action of the spring to permit unrestricted volume delivery of fluid through said nozzle and means of coaction between said valve members to shut off the flow of fluid through said nozzle after said primary valve has been opened and before said secondary valve is opened.

3. In an unrestricted volume delivery nozzle, a balanced primary valve member adapted when initially opened to permit only restricted delivery of fluid through said nozzle and adapted in an intermediate position to shut off the flow of fluid through said nozzle, a secondary valve member adapted when open to permit unrestricted volume delivery of fluid through said nozzle, said secondary valve member being spring-seated and engageable by and thereby opened by said primary valve member against the action of the spring as it is opened beyond said intermediate position thereof.

4. In a nozzle construction, a valve body, a valve seat therein, a primary valve member having a head normally seated thereagainst, a secondary valve member enclosing said head and seated against said seat, a spring tending to seat said secondary valve member, the space within said secondary valve member around said head being restricted and said head being engageable with said secondary valve member to first cut off fluid flow through the valve body and then unseat said secondary valve member against the action of said spring upon additional movement of said primary valve member to open position after initial opening thereof.

5. In a nozzle construction, a valve body, a valve seat therein, a primary valve member having a head normally seated thereagainst, said primary valve member being balanced with respect to the pressure of fluid which flows through the valve body, a secondary valve member enclosing said head and seated against said seat, a spring tending to seat said secondary valve member, the space within said secondary valve member around said head being restricted and said head being engageable with said secondary valve member to first cut off fluid flow through the valve body and then unseat said secondary valve member against the action of said spring upon additional movement of said primary valve member to open position after initial opening thereof.

6. In a nozzle construction, a valve body, a valve seat therein, a primary valve member having a head normally seated thereagainst, a secondary valve member enclosing said head and spring-seated against said seat, a spring tending to seat said secondary valve member, the space within said secondary valve member around said head being restricted and said head being engageable with said secondary valve member to first cut off fluid flow through the valve body and then unseat said secondary valve member against the action of said spring upon additional movement of said primary valve member to open position after initial opening thereof.

7. In a nozzle construction, a valve body, a seat therein, a valve member having a head normally seated thereagainst and a pair of stems projecting from opposite sides of said head and extending to the exterior of said valve body, and a cup-like member having a perforation surrounding the stem opposite said valve seat, the rim thereof being seated against said seat and the edge of the perforation therein constituting a valve closure when cooperating with said head and being spaced from said head but engageable thereby upon movement of said head from said first seat and thereby movable with said head away from said first seat, and a restricted space between the inner wall of said cup-like member and said head.

8. In a nozzle construction, a valve body, a seat therein, a valve member having a head normally seated thereagainst and a pair of stems projecting from opposite sides of said head and extending to the exterior of said valve body, means normally constraining said head to remain seated on said valve seat, and a cup-like member having a perforation surrounding the stem opposite said valve seat, the rim thereof being seated against said seat and the edge of the perforation therein constituting a valve closure when cooperating with said head and being spaced from said head but engageable thereby upon movement of said head from said first seat and thereby movable with said head away from said first seat, and a restricted space between the inner wall of said cup-like member and said head.

9. In a nozzle construction, a valve body, a seat therein, a valve member having a head normally seated thereagainst and a pair of stems projecting from opposite sides of said head and extending to the exterior of said valve body, a sleeve surrounding said head having one end seated against the portion of said valve seat surrounding said head and a seat at the other end thereof for said head to seat against to cut off fluid flow through said nozzle upon movement of said head away from the seat of said valve body and a spring tending to seat said sleeve in any position thereof.

10. In a nozzle construction, a valve body, a seat therein, a valve member having a head normally seated thereagainst, a sleeve surrounding said head and having one end seated against the portion of said valve seat surrounding said head and a spring biasing said sleeve toward seated position, said sleeve having a seat at the other end thereof for said head to seat against to cut off fluid flow through said nozzle construction upon movement of said head away from the seat of said valve body, further movement of said sleeve and head being permissible only against the tension of said spring.

11. In a nozzle construction, a valve body, a seat therein, valve members and a spring, said valve member being successively movable to first permit restricted delivery, second to stop restricted delivery, and third permit volume delivery of fluid through said valve body under constraint of the closing tendency of said spring.

12. In a nozzle construction, a valve body, a seat therein, primary and secondary valve members to seat thereagainst, said secondary valve member having a seat for said primary valve member to seat against to shut off fluid flow through said nozzle construction after said primary valve is unseated from said first valve seat and a spring biasing said secondary valve member to remain seated, said valve members being successively movable with the primary valve member unseated from the first valve seat, the primary valve member seated against the valve seat of said secondary valve member and the secondary valve member unseated from said first valve seat against the biasing tendency of said spring.

13. In a nozzle construction, a valve body, a seat therein, a valve member having a head normally seated thereagainst and a cup-like member having a perforation surrounding the stem opposite said valve seat, the rim thereof being seated against said seat and the edge of the perforation therein constituting a valve closure when cooperating with said head and being spaced from said head but engageable thereby upon movement of said head from said first seat and thereby movable with said head away from said first seat.

CHARLES W. GINTER.